Patented July 12, 1938

2,123,455

UNITED STATES PATENT OFFICE 2,123,455

LEAD WELDING

Upton B. Thomas, Jr., New Providence, N. J., assignor to Bell Telephone Laboratories, Incorporated, New York, N. Y., a corporation of New York No Drawing. Application May 20, 1936,
Serial No. 80,789

3 Claims. (Cl. 113—112)

This invention relates to the welding of lead and lead alloys, and particularly to the welding of lead alloys which have a comparatively high melting point.

In the welding of low melting point lead alloys such, for example, as the lead antimony alloys widely used in storage battery manufacture, cable sheaths, etc., the temperature required is not sufficiently high to cause the formation of lead oxide in an amount which offers serious difficulty in producing a satisfactory weld. However, when employing alloys of lead with one or more of the alkaline earth metals, it is necessary to raise the parts to a considerably higher temperature, thereby increasing the formation of lead oxide which interferes with the welding process by acting as a barrier between the parts to be welded.

It is, therefore, the object of the present invention to weld parts composed of lead or lead alloys having comparatively high melting points such, for example, as alloys of lead with the alkaline earth metals without the formation of oxides or other compounds which interfere with the production of a satisfactory weld.

To attain this object and, in accordance with a feature of the invention, there is introduced during the heating operation a substance which reacts with the lead oxide to form a compound which volatilizes at a temperature below that required for welding, without leaving any reaction products which contaminate the weld.

This invention is particularly applicable to the welding or "burning" of storage battery parts consisting of lead alloys containing small amounts of the alkaline earth metals, such as calcium, barium and strontium, but it is also applicable to the welding of pure lead or lead alloys containing small amounts of tin, copper, etc., the melting point of which is relatively high and results in an appreciable formation of lead oxide during the heating process.

In accordance with the process of the invention, the parts to be welded are prepared and heated in the usual manner until they approach the welding temperature or until the formation of a thin oxide film hinders or prevents further progress. The junction is then moistened with a solution of acetic acid which may be conveniently applied with a brush or by a spraying operation. The acetic acid removes the oxide film by combining with it to form lead acetate which is volatile at a temperature of 280° C., and, therefore, as heating is continued to the welding temperature the lead acetate evaporates without leaving any lead salt or reaction products which would contaminate or weaken the weld. After moistening with the acetic acid solution, the heating is continued and the weld completed in the usual manner. Any concentration of acetic acid in water is effective in removing the oxide film, but concentrations above 5 per cent have been found to be the most satisfactory. The water not only acts as a diluent but also aids in cooling the metal surrounding the weld.

Although the formation of lead oxide is not so serious a matter in the welding of lead alloys having comparatively low melting points, such as the lead antimony alloy commonly used in the manufacture of storage batteries, nevertheless even with these alloys the welding operation is facilitated and an improved weld results by following the process of this invention.

What is claimed is:

1. The method of welding parts composed chiefly of lead which consists in heating the parts to be welded to a temperature at which an objectionable amount of lead oxide is formed, converting the lead oxide into lead acetate by moistening the junction of said parts with a water solution of acetic acid and continuing the heating until the lead acetate is substantially completely volatilized and the required welding temperature is attained whereupon the welding of the parts is completed.

2. The method of welding parts composed chiefly of lead which consists in heating the parts to be welded to a temperature at which an objectionable amount of lead oxide is formed, converting the lead oxide into lead acetate by moistening the junction of said parts with an acetic acid solution, the acid being present in a water solution in an amount not less than 5 per cent, and continuing the heating until the lead acetate is substantially completely volatilized and the required welding temperature is attained whereupon the welding of the parts is completed.

3. The method of welding parts composed of alloys of lead and an alkaline earth metal which consists in heating the parts to be welded to a temperature approximating that required for welding, moistening the junction of said parts with a water solution of acetic acid, converting the lead oxide formed at the junction into lead acetate, and continuing the heating until the lead acetate is volatilized without leaving any reaction products to contaminate the weld and the required welding temperature is attained at which the welding of the parts is completed.

UPTON B. THOMAS, JR.